United States Patent [19]

Mueller

[11] Patent Number: 4,818,603
[45] Date of Patent: Apr. 4, 1989

[54] THERMAL-ACOUSTIC INSULATION COMPOSITE PANEL

[75] Inventor: Warren B. Mueller, Baton Rouge, La.

[73] Assignee: Ethyl Corporation, Richmond, Va.

[21] Appl. No.: 119,565

[22] Filed: Nov. 12, 1987

[51] Int. Cl.$^4$ .......................... B32B 3/26; B32B 7/12; B32B 27/18
[52] U.S. Cl. ................................. 428/316.6; 181/288; 428/317.1; 428/319.3; 428/473.5; 428/920; 428/921
[58] Field of Search ...................... 181/288; 428/304.4, 428/316.6, 317.1, 317.7, 920, 921, 319.3, 473.5

[56] References Cited

U.S. PATENT DOCUMENTS

| | | | |
|---|---|---|---|
| 3,994,838 | 11/1976 | Thompson et al. | 428/304.4 |
| 4,468,431 | 8/1984 | Okey | 428/317.7 |
| 4,576,862 | 3/1986 | Lee et al. | 428/473.5 |

Primary Examiner—William J. Van Balen
Attorney, Agent, or Firm—Joseph D. Odenweller

[57] ABSTRACT

A fire resistant thermal and acoustic composite insulating panel comprising at least one polyimide foam insert having a polyorganophosphazene septum adhered to at least one surface. The polyorganophosphazene is filled with about 50–500 parts, preferably 100–500 parts by weight of a heavy metal compound per 100 parts of polyorganophosphazene.

24 Claims, 1 Drawing Sheet

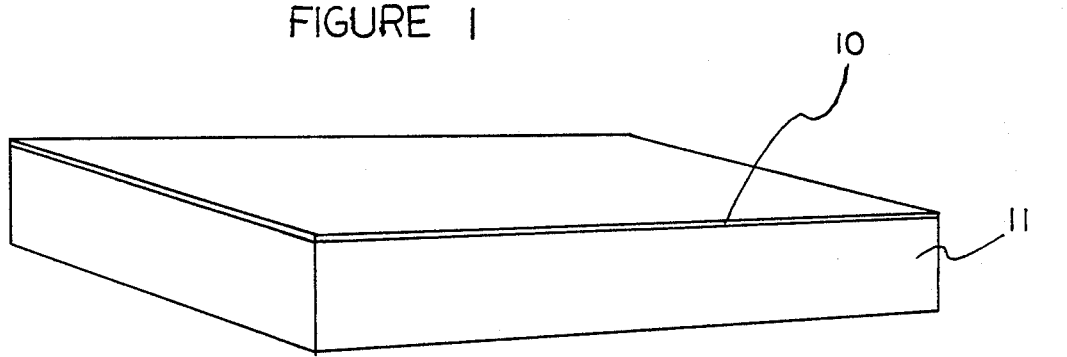
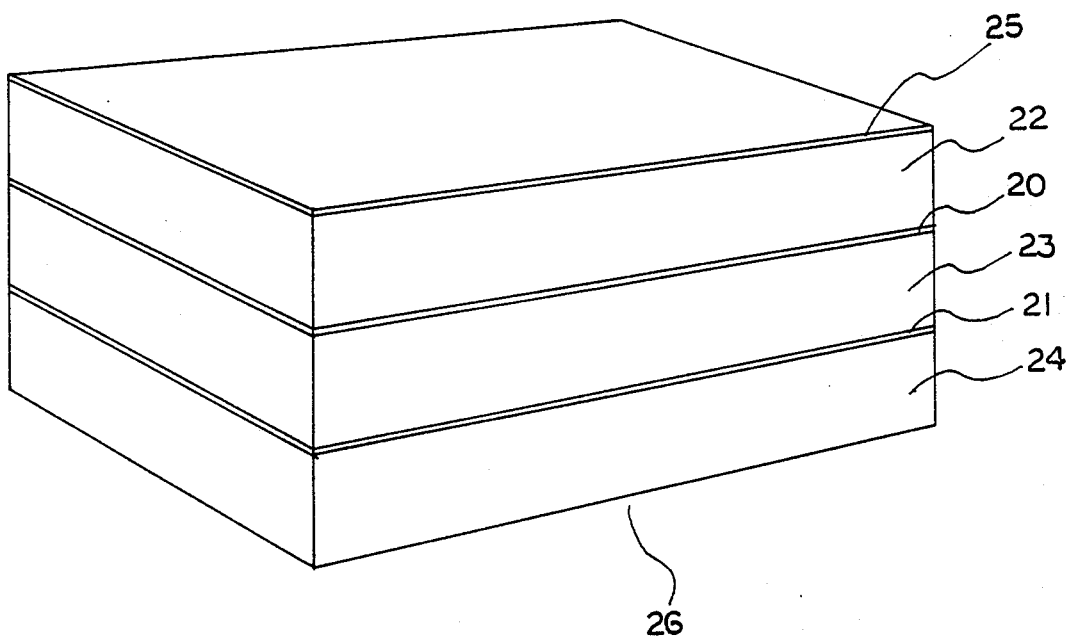

THERMAL-ACOUSTIC INSULATION COMPOSITE PANEL

BACKGROUND

Foamed polymers have long been used as thermal insulation. The best known of these is polyurethane foam. Also nitrile foams have seen limited use as thermal insulators.

Okey U.S. Pat. No. 4,68,531 describes a composite polyimide foam panel having a thin metal foil bonded to the foamed panel. The panel is said to be fire resistant and have good vibration damping and thermal insulating properties.

Thompson U.S. Pat. No. 3,994,838 describes polyaryloxy phosphazene foams and suggest their use as thermal insulation because of their fire resistance.

Polyorganophosphazenes are known compositions. A polyaryloxyphophazene is described in U.S. Pat. No. 3,856,713. A polyfluoroalkoxyphosphazene is described in U.S. Pat. No. 3,970,533. Methods of curing such polymers by sulfur vulcanization, free-radical (e.g., peroxide) cure and by reaction are well known.

SUMMARY

It has now been discovered that a thermal-acoustic insulating material can be fabricated by bonding a thin heavy metal-loaded polyorganophosphazene septum to the surface of a foamed polyimide insert. The article not only has excellent thermal and acoustic properties but is also highly fire resistant and has an exceptionally low smoke generating index making it extremely useful in space and military installations such as in ships, submarines and tanks.

DESCRIPTION OF THE DRAWINGS

FIG. 1 is a perspective view of the simplest embodiment of the invention involving one septum adhered to one polyimide insert.

FIG. 2 is a perspective drawing of a more complex structure involving three polyorganophosphazene septums and three foamed polyimide inserts.

DESCRIPTION OF THE PREFERRED EMBODIMENTS

A preferred embodiment of the invention is a composite panel having utility as a fire resistant thermal and acoustic insulating material which panel comprises at least one septum bonded to the surface of at least one foamed polyimide insert. The septum comprises a cured polyorganophosphazene composition which contains about 50–500 parts by weight of a heavy metal compound per each 100 parts by weight of polyorganophosphazene.

Polyimides are condensation products of aromatic tetracarboxycyclic acids, acid anhydrides or acid esters (including half esters) with primary aliphatic or aromatic diamines. The acid reactants can be represented by the formula

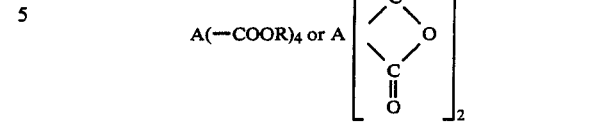

wherein R is hydrogen or lower alkyl (e.g., methyl, ethyl, propyl and the like). "A" can be a tetravalent aryl group such as

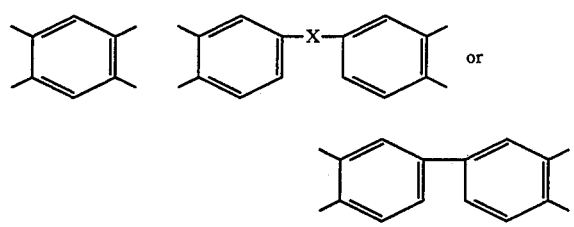

wherein X can be

—O—, —S—, —SO$_2$, —CH$_2$—, —(CH$_2$)$_2$—, —C(CF$_3$)$_2$— and the like.

Preferably the starting material is an aromatic dianhydride which is reacted with a lower alcohol, e.g., methanol, to convert each anhydride group to a half-acid ester. The preferred acidic reactant is 3,3',4,4'-benzophenone tetracarboxycyclic acid, its anhydride or half acid-esters.

A broad range of aliphatic or aromatic diamines can be reacted to form the imide groups. These include aromatic diamines, heterocyclic diamines and aliphatic diamines. The amine groups must be primary amine groups so they can form imides. Representative examples of the diamines are:

meta-phenylenediamine, p-phenylenediamine, 2,4-toluenediamine, 2,6-toluenediamine, 4,4'-methylenebisaniline, 3,3'-diaminodiphenyl sulfone, 4,4'-diaminodiphenyl sulfone, 3,3'-diaminodiphenylsulfide, 4,4'-diaminodiphenyl sulfide, 3,3'-diaminodiphenyl ether, 4,4'-diaminodiphenyl ether, 2,6-diaminopyridine, 3,5-diaminopyridine, ethylene diamine, 1,3-propane diamine, 1,4-butane diamine, 1,8-diamino octane, 1,12-diaminododecane and polyetherdiamines such as the Jeffamine (trademark Jefferson Chemical Company) polyetheramines These are amine terminated polyglycols.

Only one diamine can be used or a mixture of several diamines such as a mixture of aromatic diamines with heterocyclic diamines or a ternary mixture of aromatic, heterocyclic and aliphatic diamines can be used.

The polyimide foams can be made as described in U.S. Pat. Nos. 4,407,980; 4,425,441; 4,476,254; 4,506,038; 4,535,099; 4,556,682 and 4,562,112 all of which are incorporated herein by reference as if fully set forth.

According to a general synthetic procedure, an aromatic tetracarboxylic acid anhydride (e.g., 3,3',5,5'-benzophenone, tetracarboxycyclic acid anhydride) is reacted with an excess of methanol to foam an alcohol solution of a half acid-ester. A stoichiometric amount of diamine (e.g., 4,4′-methylenebis aniline) is added to the solution. Other compounding adjuvants can be added at this time such as surfactants (e.g., Dow Corning 190 or 193, 3M FC 430, E. I. duPont, Zonyl FSC, Union Carbide L 550 and the like) fillers, (e.g., Kelvar ® Aramide fibers, graphite fibers, glass fibers, Teflon ® fluorocarbon powder) and optionally blowing agents (e.g., toluene sulfonylhydrazide, p,p′-oxybisbenzene sulfonylhydrazide), azodicarbonimide, p-toluenesulphonyl, semicarbazide, hydroazol dicarboxylate, sodium borate, boric acid, benzoic acid, sodium bicarbonate and the like.

The polyimide foam is available commercially from IMI-Tech Corporation, Elk Grove Village, Ill.

Polyorganophosphazenes have a long backbone of

units in which n has a value from about 100 up to 100,000 or more. They are made by first heating purified phosphonitrilic chloride trimer to about 200°–250° C. in an inert atmosphere prreferably in the presence of one of the known catalyst for the polymerization. After about 12–24 hours, a linear polyphosphonitrilic chloride ("chloropolymer") will form having an intrinsic viscosity of about 0.9–1.1. This can be purified by dissolving it in a solvent such as tetrahydrofuran and then mixing the solution with an aliphatic hydrocarbon such as heptane causing the high molecular weight chloropolymer to precipitate. The purified chloropolymer can then be dissolved in a solvent such as THF and a THF solution of the desired sodium alkoxide or aryloxide added to it. These will react to form a polyorganophosphazene in which the organo groups correspond to the alkoxide and aryloxide groups in the above THF solution. The product can be washed and precipitated with water. The precipitated gum is then dried and then compounded following standard rubber technology such as by intensive mixing in a Banbury mixer.

The substituents bonded to phosphorus can vary widely and include substituted and unsubstituted alkoxy and aryloxy groups wherein the substituent groups on the alkoxy or aryloxy can be halogen (e.g., chlorine, fluorine), alkyl, alkoxy, polyalkoxy, dialkylamino, trifluoromethyl, aryloxy, alkenyl (e.g., allyl).

U.S. Pat. No. 3,970,533 describes a polyfluoroalkoxy phosphazene useful in making the septum used in the present composite panels.

The preferred polyorganophosphazene is a polyaryloxy phosphazene such as that described in Rose et al. U.S. Pat. No. 3,856,713 incorporated herein by reference. These polymers have both phenoxy and alkylphenoxy groups substituted on phosphorus. In a more preferred embodiment about 20–79 mole percent of the substituent groups on phosphorus are phenoxy and about 20–79 mole percent are lower alkyl phenoxy, especially p-ethylphenoxy. At least one mole percent up to about 15 mole percent of the substituent groups on phosphorus are olefinically unsaturated groups such as allyl, o-allylphenoxy, p-allylphenoxy, eugenoxy, isoeugenoxy and the like. Most preferably the olefinically unsaturated groups are o-allylphenoxy. These groups promote crosslinking during the cure stage whether sulfur-cured or peroxide-cured.

The polyorganophosphazene gum is compounded with certain additives to enhance its properties. The additives include lubricating fillers such as aluminum trihydrate (ATH), magnesium hydroxide, silane treated silica and the like; processing aids such as silicone rubber (e.g., Silastic ® HA-2 Dow Corning Company) and stabilizers such as Ethanox ® 330 or 376 Antioxidant, Ethyl Corporation).

The polyorganophosphazene septum can be cured or uncured in the composite panel. Preferably the septum is cured. When used as a fire resistant acoustic curtain, to be described later, curing is necessary to give adequate physical integrity.

Curing agents such as a peroxide (e.g., t-butyl perbenzoate) or the combination of sulfur and a vulcanizing accelerator system, e.g., Methyl Zimate, Butyl Zimate, Vanax 552 (products of R. T. Vanderbilt Company) can be used.

An essential part of the compounding formulation is about 50–500 parts by weight of a heavy metal compound per each 100 parts by weight of the polyorganophosphazene gum (pph). A more preferred range is about 100–500 pph and most preferably about 200–400 pph heavy metal compound. Examples of such heavy metal compounds are barium oxide, barium carbonate, barium manganate, barium hydroxide, barium phosphate, barium sulfate, bismuth trioxide, bismuth pentoxide, bismuth tetraoxide, lead carbonate, lead dioxide, red lead (Pb$_3$O$_4$), lead sesquioxide, lead phosphite, lead pyrophosphate, lead sulfate, stannic oxide, stannous oxide, stannous sulfide, zinc oxide, zinc sulfide, antimony trioxide, antimony tetraoxide and the like. Some of the above heavy metal compounds such as zinc oxide have been used in polyorgnophosphazene formulations in the past but at much lower levels and for an entirely different purpose. The acoustic properties of the polyorganophosphazene are not achieved without the massive loading with heavy metal compounds required by the present invention.

A typical formulation used in making the septum is as follows.

TABLE I

|  | Parts by Weight |
|---|---|
| polyaryloxyphosphazene gum | 100 |
| barium sulfate | 300 |
| alumina trihydrate | 25 |
| magnesium hydroxide | 25 |
| silicone rubber | 10 |
| silica | 10 |
| antioxidant | 0.5 |
| tert-butyl perbenzoate | 2.7 |

The ingredients are mixed in a conventional Banbury mixer, sheeted out on a 2-roll mill to about 3 mm thick and then fed to a calender to form the uncured septum which is then cured in an autoclave at about 150° C. for 360 minutes.

The actual construction of the composite panel is shown in its simplest form in FIG. 1. In this structure, polyorganophosphazenes septum 1 (approx. 0.25–5 mm thick, preferably about 0.4–2 mm thick) is bonded to one surface of foamed polyimide insert 11 (approx. 10–100 mm thick, preferably about 10–20 mm thick). The bonding may be by any of a number of known adhesives including the visco-elastic adhesives disclosed in U.S. Pat. No. 4,468,431.

Other useful adhesives are

| Adhesives | Mfg. |
|---|---|
| Sealfas ® Coating | H. B. Fuller |
| Foster 81-33 | H. B. Fuller |
| Spark-Fas ® | H. B. Fuller |
| ECO-TACK N.F. | Mon-Eco Industries |
| Mono-Tack S-E | Mon-Eco Industries |
| Armstrong 520 Adhesive | Armstrong World Industries |

FIG. 2 shows a multi-layer construction having two septums 20 and 21 sandwiched between 3 polyimide foam inserts 22, 23 and 24. In thie embodiment an outer septum 25 (or more correctly an "outer lamina" since it does not separate two materials) has been applied for additional sound deadening properties and to provide a surface with good physical integrity when the foam surface 26 is applied against a wall or other surface. Further resistance against puncture can be achieved by applying a fiber-glass cloth or scrim to the outer surface of outer septum 25. In the actual multi-layer composite the foamed polyimide inserts were 13 mm thick and the septums were 0.4 mm.

A further embodiment of the invention is the septum itself independent of its installation in the composite panel. The septum has other uses such as a fire resistant acoustic barrier or curtain. Accordingly the present invention also includes a fire resistant acoustic barrier comprising a sheet of cured polyorganophosphazene containing about 100-500 parts by weight of a heavy metal compound for each 100 parts by weight of polyorganophosphazene.

The prior description of the preferred embodiments for the septum constitutes a full description of the preferred embodiments of the fire resistant acoustic barrier or curtain embodiment.

Fire tests were carried out to determine the fire resistance of the polyaryloxyphosphazene septum. The aryloxy groups were about 54.1 mole percent phenoxy, 40.3 mole percent p-ethylphenoxy and about 5.6 mole percent cross-linking groups derived from o-allylphenoxy. The formulation was the same as shown in Table I.

The test sheet was 0.017 inches (0.4 mm) thick and weighed 30 oz/yd$^2$ (1.02 Kg/m$^2$). The tests used were standard Underwriters Laboratories and ASTM tests. The results were as follows.

TABLE II

| Flammability UL-94 | V-O |
|---|---|
| Limiting Oxygen Index ASTM D-2863 | >56 |
| NBS Smoke Density ASTM E-662 flaming | 60 |
| non-flaming | 20 |
| Flame Spread Index ASTM E-162 | <5 |

These results show that acoustic barrier is also an excellent fire curtain.

I claim:

1. A composite panel having utility as a fire-resistant thermal and acoustic insulating material said panel comprising at least one septum bonded to a surface of at least one foamed polyimide insert, said septum comprising a polyorganophosphazene composition containing about 50-500 parts by weight of a heavy metal compound per 100 parts by weight of polyorganophosphazene.

2. A composite panel of claim 1 wherein said septum contains about 100-500 parts by weight of a heavy metal compound per 100 parts by weight of said polyorganophosphazene.

3. A composite panel of claim 2 wherein said heavy metal compound is a barium compound.

4. A composite panel of claim 3 wherein said barium compound is barium sulfate.

5. A composite panel of claim 1 wherein said polyorganophosphazene is a polyaryloxyphosphazene.

6. A composite panel of claim 5 wherein the aryloxy groups bonded to phosphorus comprise both phenoxy and lower-alkyl phenoxy groups.

7. A composite panel of claim 6 wherein said lower alkyl phenoxy is p-ethylphenoxy.

8. A composite panel of claim 5 wherein said polyimide is the condensation product of (a) benzophenone tetracarboxcylic acid, acid anhydride or acid ester and (b) an aromatic or aliphatic diamine.

9. A composite panel of claim 8 wherein said diamine is 4,4'-methylenebisaniline.

10. A composite panel of claim 6 wherein said polyimide is the condensation product of (a) benzophenone tetracarboxcyclic acid, acid anhydride or acid ester and (b) an aromatic diamine.

11. A composite panel of claim 10 wherein said polyaryloxyphosphazene is cured and wherein about 20-79 mole percent of the substituents bonded to phosphorus are phenoxy groups and about 20-79 mole percent of the substituents bonded to phosphorus are p-ethylphenoxy groups and at least one mole percent of the substituents bonded to phosphorus are cross-linking groups derived from olefinically unsaturated substituents.

12. A composite panel of claim 1 comprising said septum bonded to and sandwiched between two of said foamed polyimide inserts.

13. A composite panel of claim 12 wherein said septum contains 100-500 parts by weight of a heavy metal compound per 100 parts by weight of said polyorganophosphazene.

14. A composite panel of claim 13 wherein said heavy metal compound is a barium compound.

15. A composite panel of claim 14 wherein said barium compound is barium sulfate.

16. A composite panel of claim 12 wherein said polyorgano phosphazene is a polyaryloxy phosphazene.

17. A composite panel of claim 16 wherein the aryloxy groups bonded to phosphorus comprise both phenoxy and lower-alkyl phenoxy groups.

18. A composite panel of claim 17 wherein said polyaryloxyphosphazene is cured and wherein the groups bonded to phosphorus include at least one mole percent up to about 15 mole percent of cross-linking groups derived from olefinically unsaturated substituents.

19. A composite panel of claim 18 wherein said olefinically unsaturated substituents are ortho-allylphenoxy.

20. A fire resistant acoustic barrier comprising a sheet of cured polyorganophosphazene containing 100-500 parts by weight of a heavy metal compound for each 100 parts of polyorganophosphazene.

21. An acoustic barrier of claim 20 wherein said polyorganophosphazene is a polyaryloxyphosphazene.

22. An acoustic barrier of claim 21 wherein said heavy metal is barium.

23. An acoustic barrier of claim 22 wherein the aryloxy substituents bonded to phosphorus are phenoxy, p-ethyl phenoxy and optionally up to about 15 mole percent of cross-linking groups derived from orthoallylphenoy and said barium compound is barium sulfate.

24. An acoustic barrier of claim 23 containing 200-400 parts by weight barium sulfate per 100 parts by weight polyaryloxyphosphazene.

* * * * *

UNITED STATES PATENT AND TRADEMARK OFFICE
CERTIFICATE OF CORRECTION

PATENT NO. : 4,818,603
DATED : April 4, 1989
INVENTOR(S) : Warren B. Mueller, et al It is certified that error appears in the above-identified patent and that said Letters Patent is hereby corrected as shown below:

Face of Patent No. [75] reads "Warren B. Mueller" and should read -- Warren B. Mueller and F. Alexander Pettigrew -- .

Column 1, line 11, reads "4,68,531" and should read -- 4,468,531 --.

Column 1, line 22, reads "polyaryloxyphophazene" and should read -- polyaryloxyphosphazene --.

Column 1, line 26 reads "reaction" and should read -- radiation --.

Column 2, line 55 reads "polyetheramines These" and should read -- polyetheramines. These --.

Column 3, line 23, reads "prreferably" and should read -- preferably --.

Column 4, line 36, reads "polyorgnophosphazene" and should read -- polyorganophosphazene -- .

Column 5, line 13, reads "thie" and should read -- this -- .

, Signed and Sealed this

Nineteenth Day of December, 1989

Attest:

JEFFREY M. SAMUELS

*Attesting Officer*  *Acting Commissioner of Patents and Trademarks*